(12) United States Patent
Sawahashi

(10) Patent No.: US 12,517,258 B2
(45) Date of Patent: Jan. 6, 2026

(54) INFORMATION PROCESSING APPARATUS, INFORMATION PROCESSING METHOD, AND AUTONOMOUS MOBILE BODY

(71) Applicant: Sony Group Corporation, Tokyo (JP)

(72) Inventor: Ryota Sawahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 136 days.

(21) Appl. No.: 18/556,362

(22) PCT Filed: Feb. 8, 2022

(86) PCT No.: PCT/JP2022/004874
§ 371 (c)(1),
(2) Date: Oct. 20, 2023

(87) PCT Pub. No.: WO2022/249567
PCT Pub. Date: Dec. 1, 2022

(65) Prior Publication Data
US 2024/0201389 A1  Jun. 20, 2024

(30) Foreign Application Priority Data
May 28, 2021  (JP) .................. 2021-089746

(51) Int. Cl.
*G01S 17/931* (2020.01)
(52) U.S. Cl.
CPC ................... *G01S 17/931* (2020.01)
(58) Field of Classification Search
CPC ................ G01S 17/931; G05D 1/02
USPC ............................................. 701/25
See application file for complete search history.

(56) References Cited

U.S. PATENT DOCUMENTS

| 10,386,476 | B2* | 8/2019 | Li ...................... G01S 13/865 |
| 11,093,763 | B2* | 8/2021 | Takemura ........... H04N 13/239 |
| 2006/0025888 | A1* | 2/2006 | Gutmann ............... G06T 7/593 |
| | | | 700/253 |
| 2017/0123429 | A1* | 5/2017 | Levinson ............. B60W 50/00 |

(Continued)

FOREIGN PATENT DOCUMENTS

| JP | 2006-011880 A | 1/2006 |
| JP | 2006011880 | * 1/2006 |
| JP | 2008-003979 A | 1/2008 |

(Continued)

OTHER PUBLICATIONS

International Search Report and Written Opinion mailed on Apr. 26, 2022, received for PCT Application PCT/JP2022/004874, filed on Feb. 8, 2022, 9 pages including English Translation.

*Primary Examiner* — Muhammad Shafi
(74) *Attorney, Agent, or Firm* — XSENSUS LLP

(57) ABSTRACT

An accumulation method for distance measurement data is set on the basis of a drive mechanism, movement performance, a peripheral environment, or a task content of an autonomous mobile body. For example, necessity of three-dimensional data accumulation is determined, and setting is made to perform two-dimensional data accumulation in a case where it is determined that the three-dimensional data accumulation is unnecessary. Furthermore, for example, resolution of the three-dimensional data accumulation is set for each axial direction of three axes X, Y, and Z or in accordance with a height.

15 Claims, 13 Drawing Sheets

(56) References Cited

U.S. PATENT DOCUMENTS

2019/0068943 A1* 2/2019 Nguyen .................. G06T 7/593
2021/0157321 A1* 5/2021 Wang ........................ G06T 7/62

FOREIGN PATENT DOCUMENTS

| JP | 2017-083919 A | 5/2017 |
| JP | 2020-087248 A | 6/2020 |

* cited by examiner

INFORMATION PROCESSING APPARATUS, INFORMATION PROCESSING METHOD, AND AUTONOMOUS MOBILE BODY

CROSS-REFERENCE TO RELATED APPLICATIONS

The present application is based on PCT filing PCT/JP2022/004874, filed Feb. 8, 2022, which claims priority from Japanese Patent Application No. 2021-089746, filed May 28, 2021, the entire contents of each are incorporated herein by reference.

TECHNICAL FIELD

The present technology relates to an information processing apparatus, an information processing method, and an autonomous mobile body, and more particularly to an information processing apparatus and the like related to accumulation of distance measurement data for autonomous movement.

BACKGROUND ART

In order for an autonomous mobile body such as a robot to move, it is necessary to determine whether or not the autonomous mobile body can move on the basis of a three-dimensional structure of a space. Conventionally, "voxel grid", "mesh", "height map", and the like have been proposed as environment recognition techniques for recognizing a three-dimensional structure of a space.

"Voxel grid" and "mesh" are three-dimensional environment recognition techniques, and require recognition of a peripheral environment in three dimensions. Therefore, calculation cost is high, leading to performance degradation of other systems. Whereas, "height map" is a two-and-a-half dimensional environment recognition technique, and can suppress calculation cost as compared with the three-dimensional environment recognition technology, but cannot perform an operation such as "going under". For example, Patent Document 1 discloses a three-dimensional environment recognition technology and a two-and-a-half dimensional environment recognition technology.

CITATION LIST

Patent Document

Patent Document 1: Japanese Patent Application Laid-Open No. 2006-011880

SUMMARY OF THE INVENTION

Problems to be Solved by the Invention

An object of the present technology is to enable environment recognition to be performed with high accuracy while suppressing calculation cost.

Solutions to Problems

A concept of the present technology is in
an information processing apparatus including:
an accumulation method setting unit configured to set an accumulation method for distance measurement data, on the basis of a drive mechanism, movement performance, a peripheral environment, or a task content of an autonomous mobile body.

In the present technology, the accumulation method setting unit sets an accumulation method for distance measurement data, on the basis of a drive mechanism, movement performance, a peripheral environment, or a task content of an autonomous mobile body.

For example, the accumulation method setting unit may be configured to determine necessity of three-dimensional data accumulation, and set to perform two-dimensional data accumulation in a case where the accumulation method setting unit determines that the three-dimensional data accumulation is unnecessary. As a result, it becomes possible to suppress calculation cost for environment recognition.

Furthermore, for example, the accumulation method setting unit may be configured to set resolution of three-dimensional data accumulation. As a result, it becomes possible to suppress the number of pieces of accumulated data and suppress the calculation cost for environment recognition, without affecting accuracy of environment recognition.

In this case, for example, the accumulation method setting unit may be configured to set resolution of the three-dimensional data accumulation for each of axial directions of three axes of X, Y, and Z. As a result, it is possible to set resolution to be fine only in an axial direction requiring fine resolution, and set resolution to be coarse in other axial directions. Therefore, it becomes possible to suppress the number of pieces of accumulated data and suppress the calculation cost for environment recognition, without affecting accuracy of environment recognition.

Furthermore, in this case, for example, the accumulation method setting unit may be configured to set resolution of the three-dimensional data accumulation in accordance with a height. As a result, it is possible to set resolution to be fine only in a height portion requiring fine resolution, and set resolution to be coarse in other height portions. Therefore, it becomes possible to suppress the number of pieces of accumulated data and suppress the calculation cost for environment recognition, without affecting accuracy of environment recognition.

For example, the accumulation method setting unit may be configured to set resolution of the three-dimensional data accumulation to be finer than other portions, in a height portion near a traveling surface of the autonomous mobile body or a height portion corresponding to an obstacle in midair or overhead. In this case, it becomes possible to suppress the number of pieces of accumulated data and suppress the calculation cost for environment recognition, without affecting accuracy of environment recognition of the height portion near the traveling surface of the autonomous mobile body or the height portion corresponding to the obstacle in midair or overhead.

Furthermore, in this case, for example, the accumulation method setting unit may be configured to set, in a case where a drive mechanism of the autonomous mobile body is a leg, resolution in a Z-axis direction in three axes of X, Y, and Z of the three-dimensional data accumulation to resolution that allows determination of a height that can be passed over by the leg. As a result, it becomes possible to suppress the number of pieces of accumulated data and suppress the calculation cost for environment recognition, without affecting the determination of the height that can be passed over by the leg.

Furthermore, in this case, for example, the accumulation method setting unit may be configured to set, in a case where a drive mechanism of the autonomous mobile body is a leg, resolution in an X-axis direction and a Y-axis direction in three axes of X, Y, and Z of the three-dimensional data accumulation to resolution that allows determination of a location of the leg. As a result, it becomes possible to suppress the number of pieces of accumulated data and suppress the calculation cost for environment recognition, without affecting the determination of the location of the leg.

Furthermore, in this case, for example, the accumulation method setting unit may be configured to set, in a case where a drive mechanism of the autonomous mobile body is a wheel, resolution in a Z-axis direction in three axes of X, Y, and Z of the three-dimensional data accumulation to resolution that allows determination of a height that can be passed over by the wheel. As a result, it becomes possible to suppress the number of pieces of accumulated data and suppress the calculation cost for environment recognition, without affecting the determination of the height that can be passed over by the wheel.

Furthermore, in this case, for example, the accumulation method setting unit may be configured to set, in a case where a drive mechanism of the autonomous mobile body is a wheel, resolution in an X-axis direction and a Y-axis direction in three axes of X, Y, and Z of the three-dimensional data accumulation to resolution that allows determination of continuity of a traveling surface. As a result, it becomes possible to suppress the number of pieces of accumulated data and suppress the calculation cost for environment recognition, without affecting the determination of the continuity of the traveling surface.

Furthermore, in this case, for example, the accumulation method setting unit may be configured to set, in a case of being in a known environment, resolution of the three-dimensional data accumulation to resolution corresponding to the known environment. As a result, it becomes possible to suppress the number of pieces of accumulated data and suppress the calculation cost for environment recognition, without affecting accuracy of environment recognition.

Furthermore, in this case, for example, the accumulation method setting unit may be configured to set resolution of the three-dimensional data accumulation to default resolution, in a case of being in an unknown environment. As a result, it becomes possible to perform environment recognition with a certain degree of accuracy.

For example, the accumulation method setting unit may be configured to change, in a case where a specific environment requiring a resolution change of the three-dimensional data accumulation is detected, the resolution of the three-dimensional data accumulation to resolution corresponding to the specific environment. As a result, it becomes possible to suppress the number of pieces of accumulated data and suppress the calculation cost for environment recognition, without affecting accuracy of environment recognition of the specific environment.

Furthermore, in this case, for example, the accumulation method setting unit may be configured to set, in a case where a target object specified by the task content is detected, resolution of the three-dimensional data accumulation to be finer in a portion corresponding to the target object than that in other portion. As a result, it becomes possible to suppress the number of pieces of accumulated data and suppress the calculation cost for environment recognition, without affecting accuracy of recognition of the target object specified according to the task content.

Furthermore, for example, an obstacle detection unit configured to detect an obstacle on the basis of the distance measurement data accumulated by a data accumulation method set by the accumulation method setting unit may be further included. In this case, the obstacle detection unit can perform obstacle detection, that is, environment recognition with high accuracy while suppressing calculation cost.

In this way, in the present technology, the accumulation method for distance measurement data is set on the basis of the drive mechanism, the movement performance, the peripheral environment, or the task content of the autonomous mobile body, and it becomes possible to perform environment recognition with high accuracy while suppressing calculation cost.

Furthermore, another concept of the present technology is in an information processing method including:
a procedure of setting an accumulation method for distance measurement data, on the basis of a drive mechanism, movement performance, a peripheral environment, or a task content of an autonomous mobile body.

Furthermore, another concept of the present technology is in an autonomous mobile body including:
a sensor unit configured to acquire distance measurement data;
an accumulation method setting unit configured to set an accumulation method for the distance measurement data, on the basis of a drive mechanism, movement performance, a peripheral environment, or a task content;
an obstacle detection unit configured to detect an obstacle on the basis of the distance measurement data accumulated by a data accumulation method set by the accumulation method setting unit; and
a movement control unit configured to control movement on the basis of an obstacle detection result of the obstacle detection unit.

MODE FOR CARRYING OUT THE INVENTION

Hereinafter, an embodiment for implementing the invention (hereinafter, referred to as an embodiment) will be described. Note that, the description will be given in the following order.
1. Embodiment
2. Modification Example 1. Embodiment

[Description Regarding Present Technology]

An object of the present technology is to enable environment recognition to be performed with high accuracy while suppressing calculation cost, and various approaches therefor will be described.

First, there is a viewpoint of what to switch, as an approach. In this case, for example, the following items are considered as examples.
 (1) Resolution for each axis is switched as needed
 (2) Recognition is performed with fine resolution up to a height that can be passed over, as needed
 (3) Resolution is switched in accordance with traveling environment
 (4) Switching is performed to 3D (three-dimensional environment recognition) mode or 2D (two-and-a-half dimensional environment recognition) mode, as needed Furthermore, there is a viewpoint of what is a trigger for switching, as an approach. In this case, for example, the following items are considered as examples. Here, (1) to (4) are given as advance information, and (5) is determined at a time of movement (at the time of traveling).
 (1) Conditions of a mobile body (a mechanism and performance)
 (2) Task contents
 (3) An area is designated by a person in advance with a tool
 (4) Information embedded in an existing map is used
 (5) A recognizer that recognizes the presence of a slope, cliff, or the like is introduced Specific examples of approaches will be described.
"Approach 1"

Switching between the 3D mode and the 2D mode as Approach 1 will be described.

Figure 1:
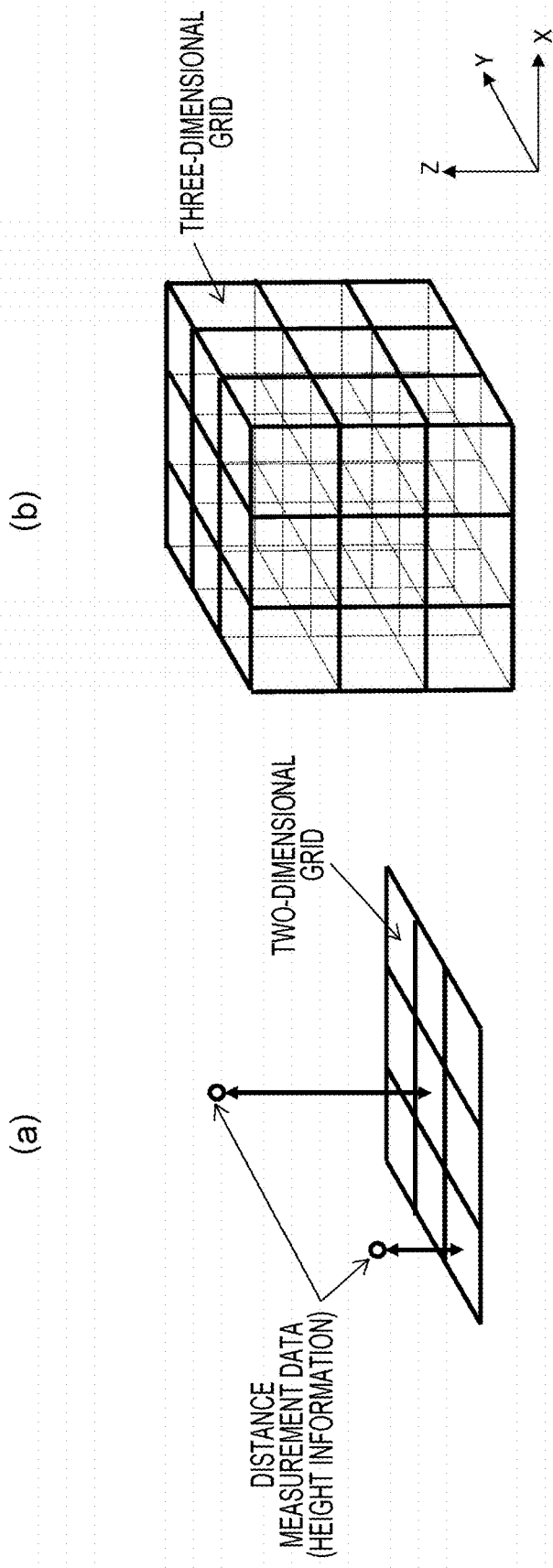
FIG. 1 is a view for explaining a data accumulation method of a 2D (two-and-a-half dimensional environment recognition) mode and 3D (three-dimensional environment recognition).

In the case of 2D (two-and-a-half dimensional environment recognition) mode, as illustrated in FIG. 1(a), a two-dimensional grid is set around an autonomous mobile body, and data accumulation is performed so as to have a maximum value (height information) in the Z direction in a predetermined number of pieces of distance measurement data, in correspondence to each two-dimensional grid. Hereinafter, this will be appropriately referred to as two-dimensional (2D) data accumulation.

In the case of the 3D mode, as illustrated in FIG. 1(b), a three-dimensional grid is set around the autonomous mobile body, and data accumulation is performed so as to have information indicating whether or not the distance measurement data belongs to the three-dimensional grid, in correspondence to each three-dimensional grid. Hereinafter, this will be appropriately referred to as three-dimensional (3D) data accumulation.

When the environment recognition can be sufficiently performed in the 2D mode, it is conceivable to perform two-dimensional (2D) data accumulation in order to reduce calculation cost and a data amount.

As a case where environment recognition in the 3D mode is necessary, for example, the following is considered.
 (1) A case of detecting a traveling surface
 (2) A case of recognizing an object shape, such as a case of grasping an object
 (3) A case of detecting an object in midair, such as a case of going through a tunnel
 (4) A case of detecting a slope As a case where the environment recognition in the 2D mode may be used, for example, the following is considered.
 (1) A case where being a flat surface is known, such as indoors
 (2) A case of being in movement on a slope (3D until the slope is detected)

"Approach 2"

Switching of resolution for each axial direction in three-dimensional data accumulation as Approach 2 will be described. In an autonomous mobile body that moves (travels) on the ground, such as a robot or a vehicle, it is necessary to be particularly alert to an obstacle (level difference) in a direction (Z-axis direction) perpendicular to the ground.

Figure 2:
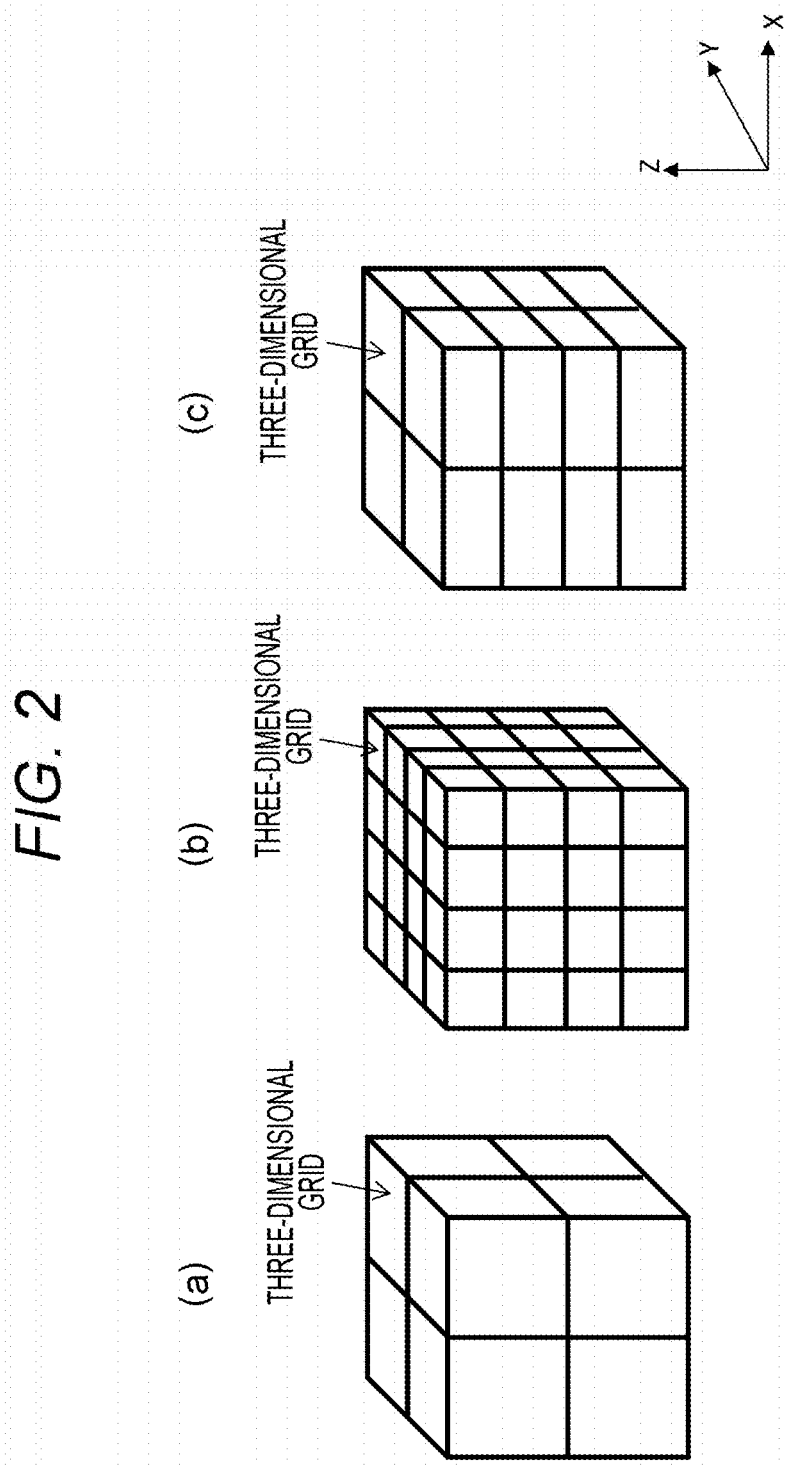
FIG. 2 is a view for explaining switching of resolution for each axial direction in three-dimensional data accumulation.

FIG. 2(a) illustrates a case where resolution in the three-dimensional data accumulation is coarse, that is, a case where a size of the three-dimensional grid is large. In this case, accuracy of environment recognition is low, but the calculation cost can be made low. FIG. 2(b) illustrates a case where resolution in the three-dimensional data accumulation is fine, that is, a case where the size of the three-dimensional grid is small. In this case, accuracy of environment recognition is high, but the calculation cost becomes high.

FIG. 2(c) illustrates a case where only resolution in an axial direction requiring accuracy, in this example, the Z-axis direction is made fine with respect to resolution in the three-dimensional data accumulation. In this case, it is possible to sufficiently secure accuracy of environment recognition in the axial direction requiring accuracy, and to suppress the number of three-dimensional grids and thus the number of pieces of data, and the calculation cost can be suppressed as compared with the case of FIG. 2(b).

Figure 3:
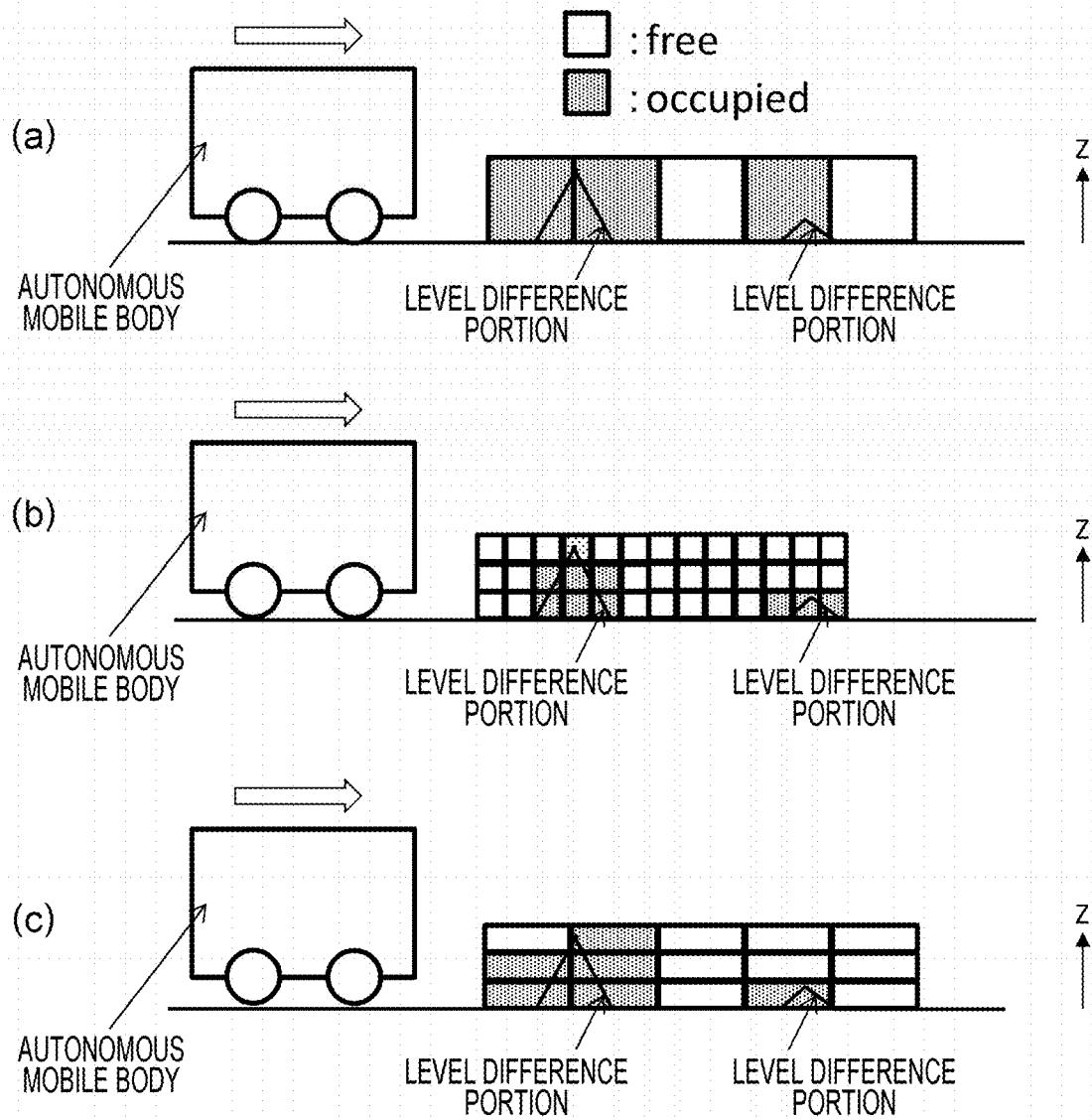
FIG. 3 is a view illustrating an example (level difference detection example) of switching of resolution for each axial direction in the three-dimensional data accumulation.

FIG. 3 illustrates level difference detection as an example. FIG. 3(a) illustrates a case where the size of the three-dimensional grid is large, and thus resolution is coarse. In this case, since Z-direction positions of the three-dimensional grids corresponding to a large step and a small step are the same, it is not possible to discriminate between a level difference that can be passed over and a level difference that cannot be passed over.

FIG. 3(b) illustrates a case where the size of the three-dimensional grid is small, and thus resolution is fine. In this case, since Z-direction positions of the three-dimensional grids corresponding to the large step and the small step correspond to the sizes of the level differences, it is possible to discriminate between the level difference that can be passed over and the level difference that cannot be passed over, but the calculation cost increases.

FIG. 3(c) illustrates a case where only resolution in the direction (Z-axis direction) perpendicular to the ground where accuracy is required is made fine. In this case, similarly to the case of FIG. 3(b), it is possible to accurately determine a height of the level difference and to suppress a total number of three-dimensional grids and thus the number of pieces of data as compared with the case of FIG. 3(b), and the calculation cost can be suppressed.

Figure 4:
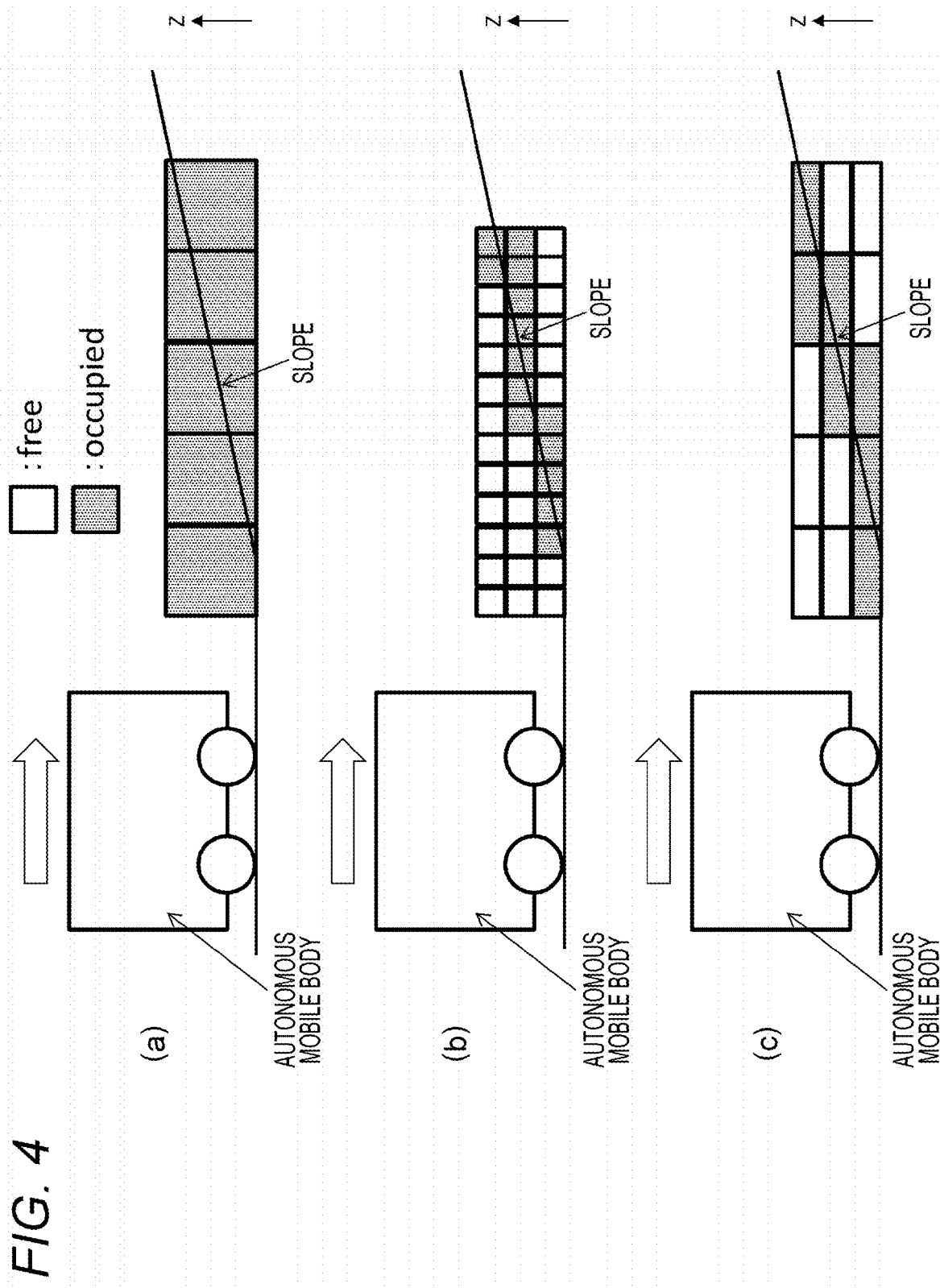
FIG. 4 is a view illustrating an example (slope detection example) of switching of resolution for each axial direction in the three-dimensional data accumulation.

FIG. 4 illustrates slope detection as an example. FIG. 4(a) illustrates a case where the size of the three-dimensional grid is large, and thus resolution is coarse. In this case, since all the Z-direction positions of the three-dimensional grids corresponding to a surface of the slope are the same, it is not possible to discriminate between the slope and a flat ground.

FIG. 4(b) illustrates a case where the size of the three-dimensional grid is small, and thus resolution is fine. In this case, since Z-direction positions of the three-dimensional grids corresponding to the surface of the slope correspond to positions of the surface, it becomes possible to discriminate between the slope and the flat ground, but the calculation cost increases.

FIG. 4(c) illustrates a case where only resolution in the direction (Z-axis direction) perpendicular to the ground where accuracy is required is made fine. In this case, similarly to the case of FIG. 4(b), it is possible to accurately determine the slope and to suppress a total number of three-dimensional grids and thus the number of pieces of data as compared with the case of FIG. 4(b), and the calculation cost can be suppressed.

"Approach 3"

Switching of resolution according to a height in the three-dimensional data accumulation as Approach 3 will be described. In an autonomous mobile body that moves (travels) on the ground, such as a robot or a vehicle, it is desired to obtain detailed information in the vicinity of a traveling surface (in the vicinity of a foot), but resolution of a degree that allows avoidance of an obstacle may be sufficient above the vicinity of the traveling surface.

Figure 5:
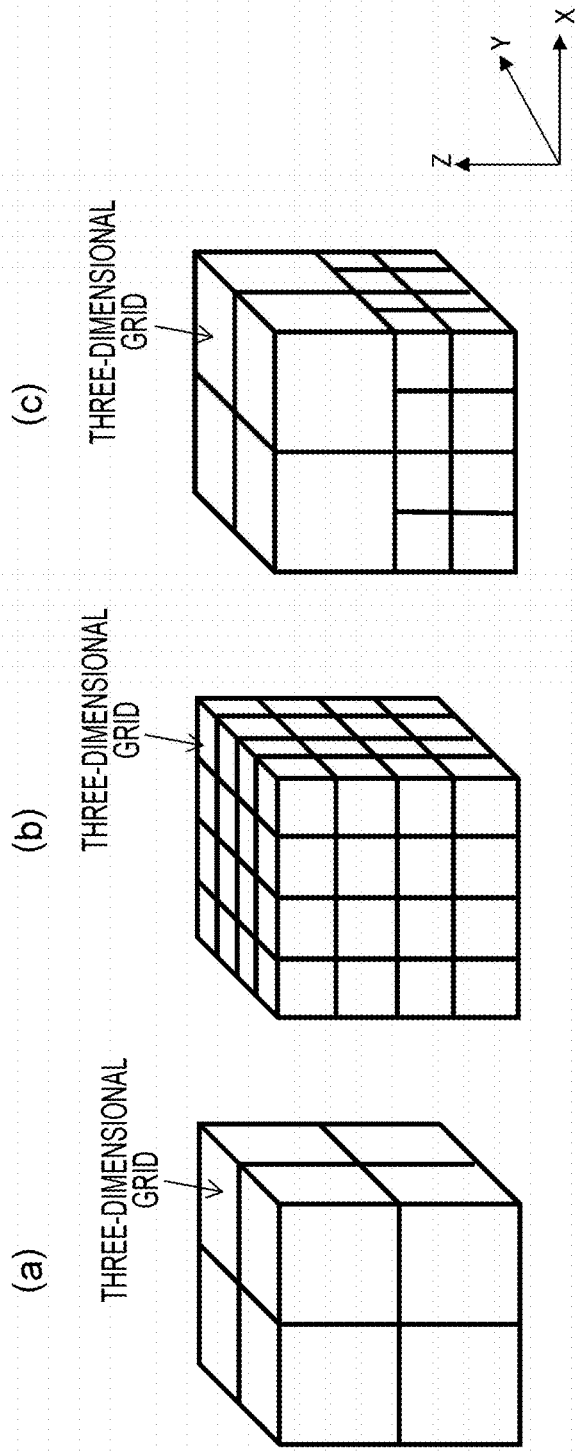
FIG. 5 is a view for explaining switching of resolution according to a height in the three-dimensional data accumulation.

FIG. 5(a) illustrates a case where resolution in the three-dimensional data accumulation is coarse, that is, a case where the size of the three-dimensional grid is large. In this case, accuracy of environment recognition is low, but the calculation cost can be made low. FIG. 5(b) illustrates a case where resolution in the three-dimensional data accumulation is fine, that is, a case where the size of the three-dimensional grid is small. In this case, accuracy of environment recognition is high, but the calculation cost becomes high.

FIG. 5(c) illustrates a case where only resolution up to a certain height is made fine with respect to resolution in the three-dimensional data accumulation. In this case, it is possible to sufficiently secure accuracy of environment recognition at a height requiring accuracy, and to suppress the number of three-dimensional grids and thus the number of pieces of data, and the calculation cost can be suppressed as compared with the case of FIG. 5(b).

Figure 6:
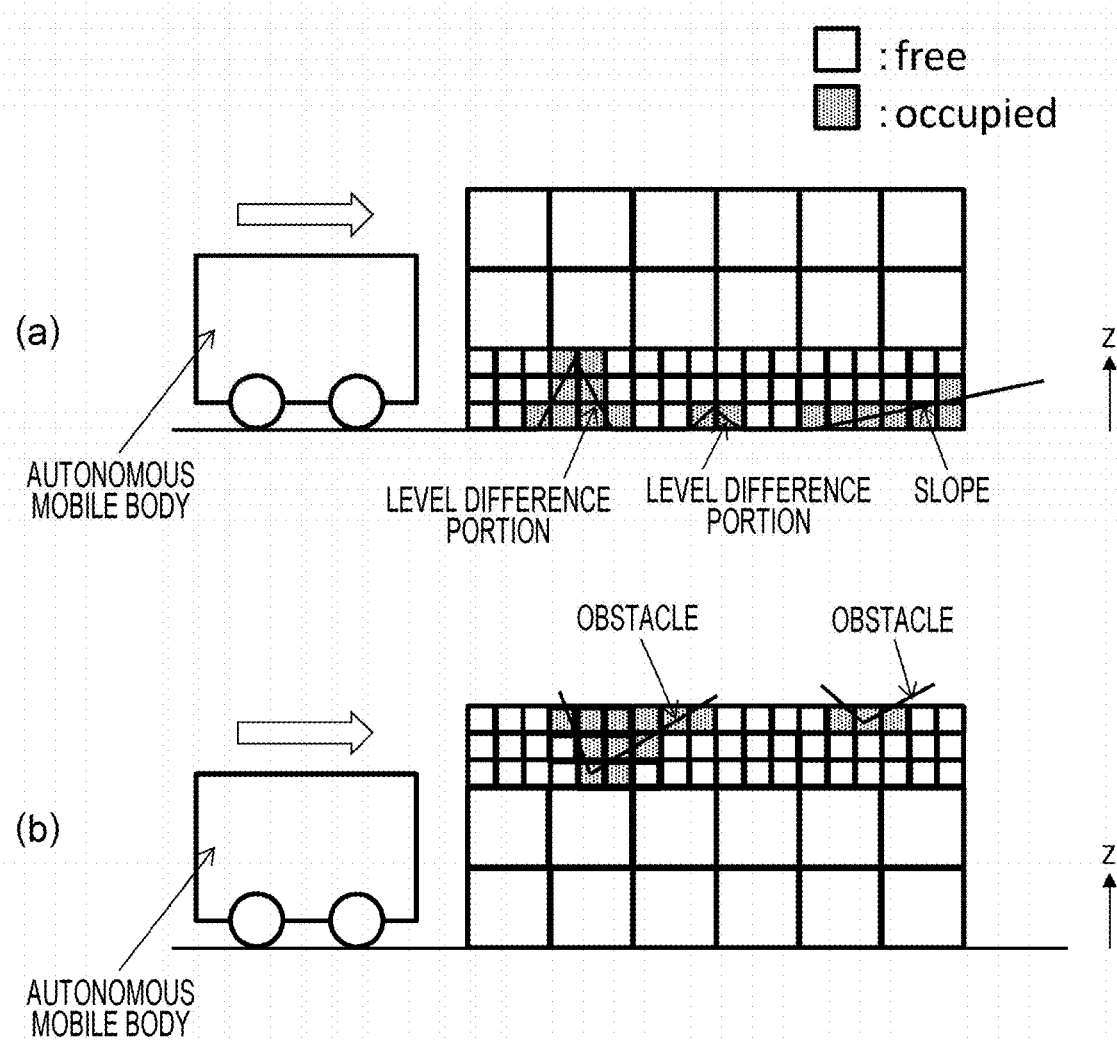
FIG. 6 is a view illustrating an example (level difference and slope detection example) of switching of resolution according to a height in the three-dimensional data accumulation.

FIG. 6(a) illustrates detection of a level difference or a slope on a traveling surface as an example, and illustrates a case where only resolution of a height portion near the traveling surface is made fine. In this case, it is possible to accurately determine the level difference and the slope of the traveling surface, and to suppress the number of entire three-dimensional grids and thus the number of pieces of data, and the calculation cost can be suppressed.

Note that FIG. 6(b) illustrates detection of an obstacle in midair or overhead as an example, and illustrates a case where only resolution of a height portion corresponding to the obstacle in midair or overhead is made fine. In this case, it is possible to accurately determine the obstacle in midair and overhead, and to suppress the number of entire three-dimensional grids and thus the number of pieces of data, and the calculation cost can be suppressed.

"Approach 4"

Switching of resolution according to a moving (traveling) environment in the three-dimensional data accumulation as Approach 4 will be described.

In an indoor environment or an environment where a road surface is paved and there is almost no unevenness, resolution is made coarse. Furthermore, when the road surface is an uneven ground, resolution is made fine. In this case, resolution can be switched on the basis of advance information about the road surface on which the autonomous mobile body moves (travels) or by detecting a situation of the road surface from sensor data.

Furthermore, although resolution is set to be fine at first, in a case where only resolution having no influence on traveling of the autonomous mobile body is detected, it is conceivable to reduce the calculation cost by making the resolution coarse. Furthermore, for example, by introducing a detector that directly detects an obstacle such as a person from sensor data, it is sufficient to recognize only a situation of the road surface in accumulated data. Therefore, it is possible to make resolution coarse in a portion other than the road surface.

"Configuration of travel control device for autonomous mobile body"

Figure 7:
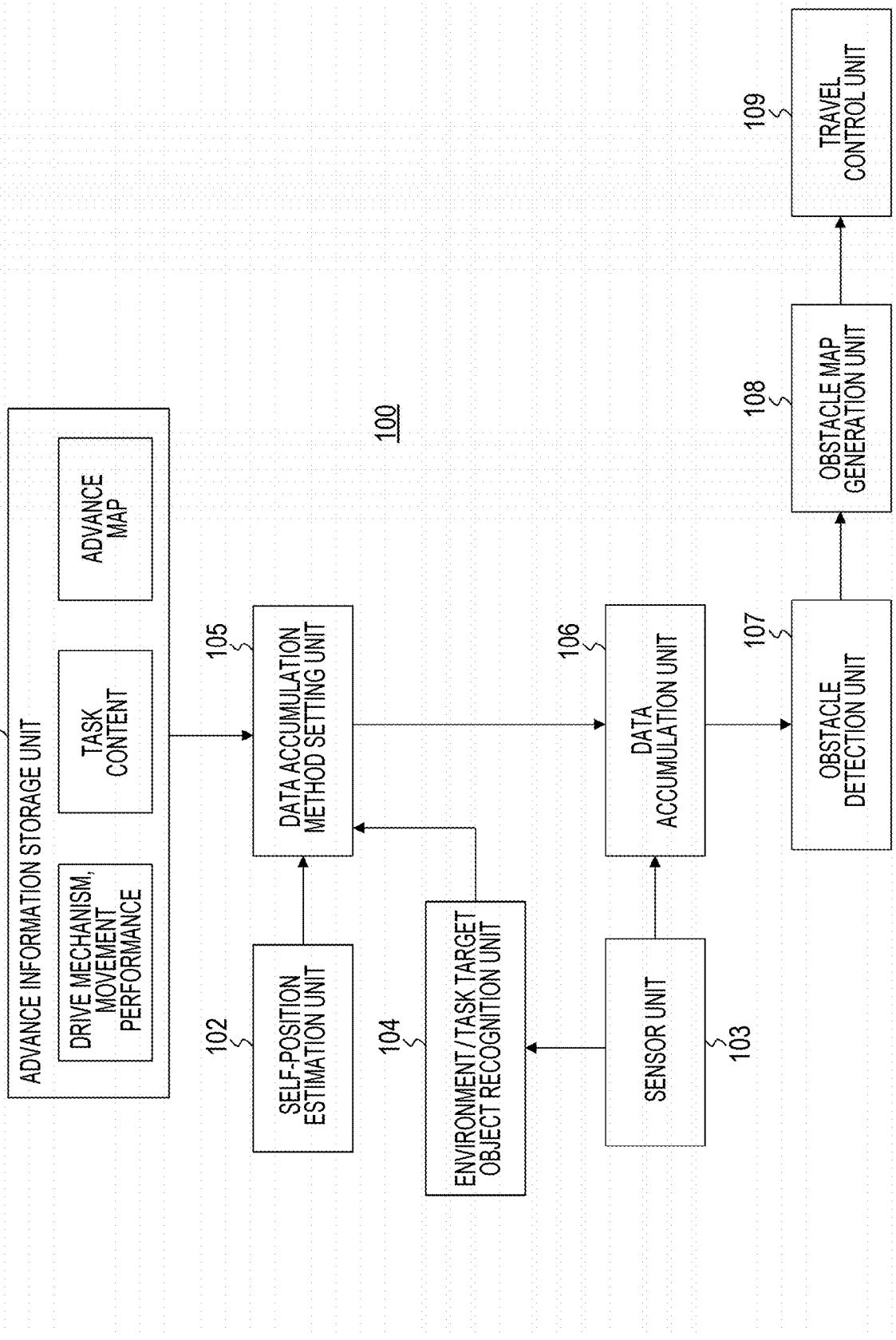
FIG. 7 is a block diagram illustrating a configuration example of an autonomous mobile body as an embodiment.

FIG. 7 illustrates a configuration example of an autonomous mobile body 100 as an embodiment. The autonomous mobile body 100 includes an advance information storage unit 101, a self-position estimation unit 102, a sensor unit 103, an environment/task target object recognition unit 104, a data accumulation method setting unit 105, a data accumulation unit 106, an obstacle detection unit 107, an obstacle map generation unit 108, and a travel control unit 109.

The advance information storage unit 101 stores advance information. Examples of the advance information include information about a drive mechanism and movement performance of the autonomous mobile body 100, information about a task content, and information about advance map. Note that the advance information is not limited to those described above, and may further include other information.

The information about the drive mechanism is, for example, information indicating a leg, a wheel, or the like. The information about the movement performance is, for example, information indicating a height of a level difference that can be passed over, a size of a hole that does not cause falling and thus does not need to be recognized, or the like.

Furthermore, the information about the task content is information indicating an operation to be performed other than movement performed by the autonomous mobile body 100, and includes at least information about an object (task target object) related to the operation. For example, in a case where the autonomous mobile body 100 performs an operation of opening a door, the target object is a door knob. Furthermore, for example, in a case where the autonomous mobile body 100 performs an operation of holding and carrying an object with a manipulator, the task target object is the object to be held. Furthermore, for example, in a case where the autonomous mobile body 100 performs an operation of finding and following a certain person, the task target object is the certain person.

The information about the advance map is position information of a range in which the autonomous mobile body moves. In the information about the advance map, for example, information indicating that a position may be in the 2D mode instead of the 3D mode is embedded in association with the position. Furthermore, in the information about the advance map, information about resolution in the three-dimensional data accumulation determined at a time of movement is embedded as a known environment, regarding a position that is where the autonomous mobile body 100 has already moved and is of a 3D mode target. This advance map is updated such that an unknown environment changes to a known environment as the autonomous mobile body 100 moves.

The self-position estimation unit 102 estimates a self-position of the autonomous mobile body 100 on the basis of acquired information of an inertial measurement unit (IMU), a global positioning system (GPS), or the like. The sensor unit 103 includes various sensors such as, for example, a light detection and ranging (LiDAR), a depth camera, a time of flight (ToF), and an image sensor.

The environment/task target object recognition unit 104 analyzes, for example, an output of an image sensor included in the sensor unit 103, recognizes a peripheral environment of the autonomous mobile body 101, and further, detects a target object (task target object) related to the task content of the autonomous mobile body 101. Note that the information about the target object related to the task content is present in the advance information storage unit 101 as described above.

The data accumulation method setting unit 105 periodically sets an accumulation method for distance measurement data obtained by a distance measurement sensor such as LiDAR included in the sensor unit 103, on the basis of the drive mechanism, the movement performance, the peripheral environment, or the task content of the autonomous mobile body 100. To the data accumulation method setting unit 105, as reference information for determining the accumulation method, various types of information stored in the advance information storage unit 101, information about a self-position estimated by the self-position estimation unit 102, recognition information about a peripheral environment and a task target object obtained by the environment/task target object recognition unit 104, and the like are given.

The data accumulation method setting unit 105 determines necessity of the three-dimensional data accumulation, and sets to perform the two-dimensional data accumulation in a case where the data accumulation method setting unit 105 determines that the three-dimensional data accumulation is unnecessary. Furthermore, in a case of setting to perform the three-dimensional data accumulation, the data accumulation method setting unit 105 further sets resolution of the three-dimensional data accumulation. Note that the setting of the data accumulation method in the data accumulation method setting unit 105 will be further described later.

The data accumulation unit 106 periodically accumulates the distance measurement data obtained by the distance measurement sensor such as LiDAR included in the sensor unit 103, by using the method set by the data accumulation method setting unit 105. That is, in a case where the two-dimensional data accumulation is set as the data accumulation method, the distance measurement data obtained by the distance measurement sensor such as LiDAR is subjected to two-dimensional (2D) data accumulation after two-dimensional integration processing (see FIG. 1(a)). Furthermore, in a case where the three-dimensional data accumulation is set as the data accumulation method, on the basis of resolution that is further set, the distance measurement data obtained by the distance measurement sensor such as LiDAR is subjected to three-dimensional (3D) data accumulation after three-dimensional integration processing (see FIG. 1(b)).

The obstacle detection unit 107 detects an obstacle on the basis of accumulated data in the data accumulation unit 106. In this case, two-dimensional obstacle detection is performed at a position where two-dimensional (2D) data accumulation is performed, and three-dimensional obstacle detection is performed at a position where three-dimensional (3D) data accumulation is performed.

The obstacle map generation unit 108 generates an obstacle map on the basis of the obstacle detected by the obstacle detection unit 107. In this case, a two-dimensional obstacle map is generated when two-dimensional obstacle detection is performed, and a three-dimensional obstacle map is generated when three-dimensional obstacle detection is performed.

The travel control unit 109 controls movement (traveling) of the autonomous mobile body 100 on the basis of the obstacle map generated by the obstacle map generation unit 108. Note that the travel control unit 109 also controls movement of the autonomous mobile body 100 on the target object related to the task content, on the basis of the obstacle map. For example, in a case where the autonomous mobile body 100 performs an operation of opening a door, the travel control unit 109 accurately recognizes a door knob that is the task target object on the basis of the obstacle map, and controls the autonomous mobile body 100 to smoothly open the door by appropriately operating the door knob.

Figure 8:
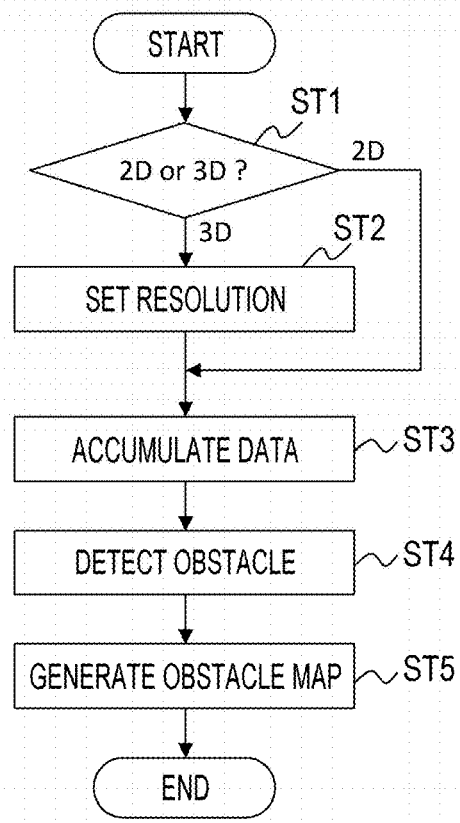
FIG. 8 is a flowchart illustrating a series of processing in a data accumulation method setting unit, a data accumulation unit, an obstacle detection unit, and an obstacle map generation unit.

"Details of setting and the like of data accumulation method" A flowchart of FIG. 8 illustrates a series of processing in the data accumulation method setting unit 105, the data accumulation unit 106, the obstacle detection unit 107, and the obstacle map generation unit 108.

In step ST1, the data accumulation method setting unit 105 determines whether to perform the three-dimensional data accumulation or the two-dimensional data accumulation. In this case, the data accumulation method setting unit 105 determines necessity of the three-dimensional data accumulation, and sets to perform the two-dimensional data accumulation in a case where the data accumulation method setting unit 105 determines that the three-dimensional data accumulation is unnecessary. As a result, it becomes possible to suppress calculation cost for environment recognition.

The necessity of the three-dimensional data accumulation is determined on the basis of, for example, information embedded in association with the position in the advance map and indicating that the 2D mode may be used instead of the 3D mode. Note that this determination can also be made on the basis of recognition information about the peripheral environment of the autonomous mobile body 100 from the environment/task target object recognition unit 104. For example, the data accumulation method setting unit 105 can determine to perform the two-dimensional data accumulation in a case where the autonomous mobile body 100 is moving on a flat portion or the like such as indoors.

First, in a case where setting is made to perform the three-dimensional data accumulation in step ST1, the processing proceeds to step ST2. In step ST2, the data accumulation method setting unit 105 further sets resolution of the three-dimensional data accumulation. In this case, the data accumulation method setting unit 105 sets the resolution of the three-dimensional data accumulation on the basis of the drive mechanism, the movement performance, the peripheral environment, the task content, or the like of the autonomous mobile body 100. By setting the resolution of the three-dimensional data accumulation in this manner, it becomes possible to suppress the number of pieces of accumulated data and suppress the calculation cost for environment recognition, without affecting accuracy of environment recognition.

After step ST2, the processing proceeds to step ST3. Furthermore, in a case where setting is made to perform the two-dimensional data accumulation in step ST1, the processing proceeds to step ST3. In step ST3, the data accumulation unit 106 accumulates the distance measurement data obtained by the distance measurement sensor of the sensor unit 103, by using the method set by the data accumulation method setting unit 105 in steps ST1 and ST2.

Next, in step ST4, the obstacle detection unit 107 detects an obstacle on the basis of the accumulated data accumulated by the data accumulation unit 106. In this case, two-dimensional obstacle detection is performed when two-dimensional (2D) data accumulation is performed, and three-dimensional obstacle detection is performed when three-dimensional (3D) data accumulation is performed. As described above, in a case where the three-dimensional data accumulation is unnecessary, the two-dimensional data accumulation is performed, and data accumulation is performed with resolution set as necessary, also in the three-dimensional data accumulation. Therefore, it is possible to perform obstacle detection, that is, environment recognition with high accuracy while suppressing calculation cost.

Next, in step ST5, the obstacle map generation unit 108 generates an obstacle map on the basis of the obstacle detected by the obstacle detection unit 107. In this case, a two-dimensional obstacle map is generated when two-dimensional obstacle detection is performed, and a three-dimensional obstacle map is generated when three-dimensional obstacle detection is performed.

Figure 9:
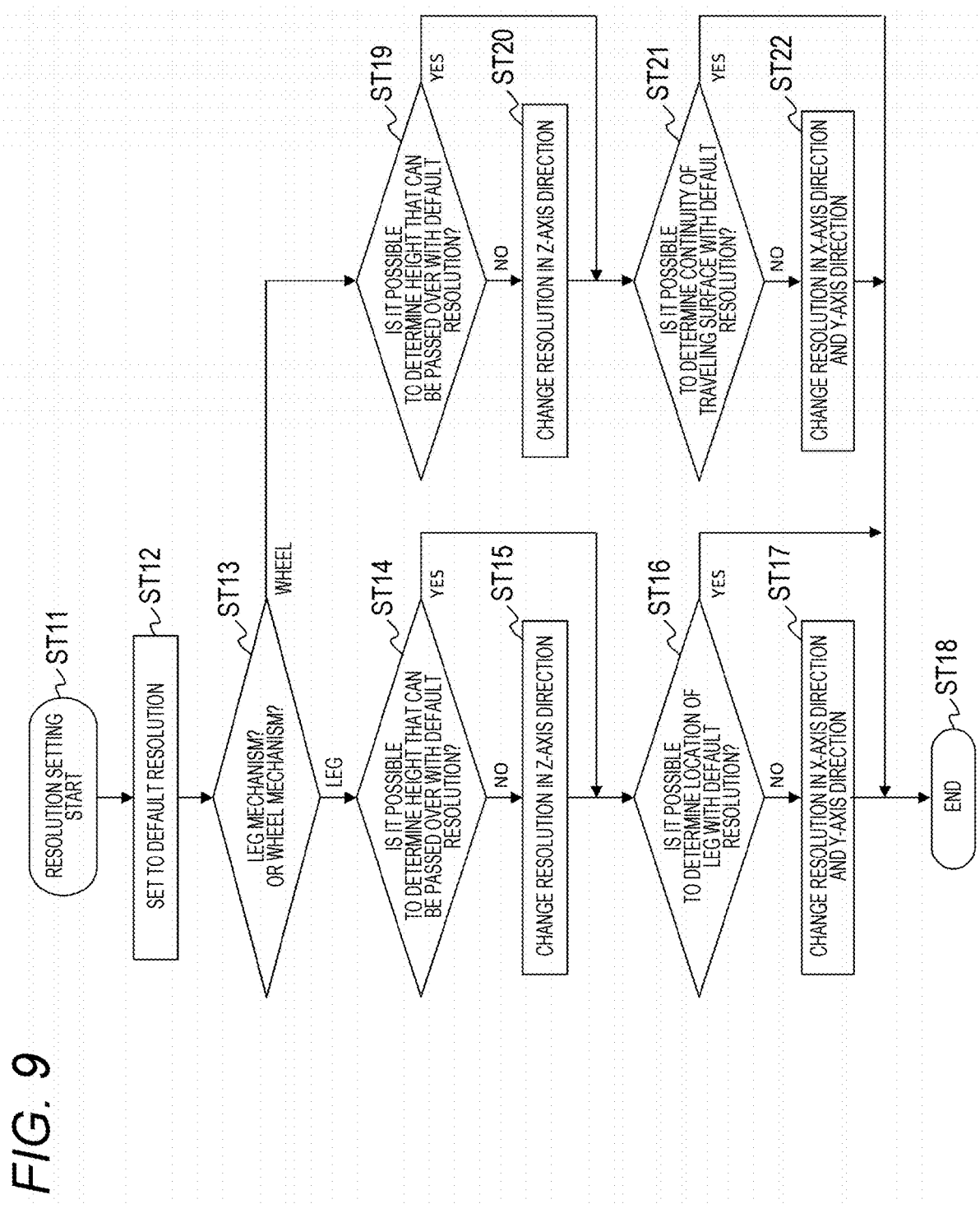
FIG. 9 is a flowchart illustrating an example of a processing procedure of resolution setting of three-dimensional (3D) data accumulation in the data accumulation method setting unit.

A flowchart of FIG. 9 illustrates an example of a processing procedure of resolution setting for three-dimensional (3D) data accumulation (see step ST2 of FIG. 8) in the data accumulation method setting unit 105.

This example is an example in which resolution of the three-dimensional data accumulation is set for each axial direction in the three axes of X, Y, and Z. By setting the resolution for each axial direction in this manner, it is possible to set resolution to be fine only in an axial direction requiring fine resolution and set resolution to be coarse in other axial directions. Therefore, it becomes possible to suppress the number of pieces of accumulated data and suppress the calculation cost for environment recognition, without affecting accuracy of environment recognition.

First, in step ST11, the data accumulation method setting unit 105 starts the processing. Then, in step ST12, the data accumulation method setting unit 105 sets resolution of the three-dimensional data accumulation to default resolution. Incidentally, in this default resolution, sizes of the three-dimensional grid in the X-axis direction, the Y-axis direction, and the Z-axis direction are equal, and the three-dimensional grid has a cubic shape.

Next, in step ST13, the data accumulation method setting unit 105 determines whether the drive mechanism of the autonomous mobile body 100 is a leg or a wheel. In this case, the determination is made on the basis of the information about the drive mechanism stored in the advance information storage unit 101.

In a case where the drive mechanism is a leg, in step ST14, the data accumulation method setting unit 105 determines whether or not it is possible to determine a height that can be passed over by the autonomous mobile body 100, with the default resolution. In this case, the height that can be passed over by the autonomous mobile body 100 is recognized on the basis of the information about the movement performance stored in the advance information storage unit 101.

When it is not possible to determine the height that can be passed over by the autonomous mobile body 100, in step ST15, the data accumulation method setting unit 105 changes resolution in the Z-axis direction (vertical direction) to be fine and thus a size of the three-dimensional grid in the Z-axis direction to be small, to a degree that allows determination of the height that can be passed over by the autonomous mobile body 100. By setting the resolution in the Z-axis direction to a degree that allows determination of the height that can be passed over by the autonomous mobile body 100, that is, by the leg thereof in this manner, it becomes possible to suppress the number of pieces of accumulated data and suppress the calculation cost for environment recognition, without affecting the determination of the height that can be passed over by the leg.

After the processing of step ST15, the data accumulation method setting unit 105 proceeds to processing of step ST16. Note that when it is possible to determine the height that can be passed over by the autonomous mobile body 100 with the default resolution in step ST14, the data accumulation method setting unit 105 immediately proceeds to the processing of step ST16.

In step ST16, the data accumulation method setting unit 105 determines whether or not a location of the leg of the autonomous mobile body 100 can be determined with the default resolution. When it is not possible to determine the location of the leg of the autonomous mobile body 100, in step ST17, resolution in the X-axis direction and the Y-axis direction (horizontal direction) is changed to be fine, and thus a size of the three-dimensional grid in the X-axis direction and the Y-axis direction to be small, to a degree that allows determination of the location of the leg of the autonomous mobile body 100. In this way, by setting the resolution in the X-axis direction and the Y-axis direction to a degree that allows determination of the location of the leg of the autonomous mobile body 100, it becomes possible to suppress the number of pieces of accumulated data and suppress the calculation cost for environment recognition, without affecting the determination of the location of the leg.

After the processing of step ST17, the data accumulation method setting unit 105 ends the processing in step ST18.

Furthermore, in a case where the drive mechanism is a wheel in step ST13, the data accumulation method setting unit 105 determines, in step ST19, whether or not it is possible to determine a height that can be passed over by the autonomous mobile body 100, with the default resolution. In this case, the height that can be passed over by the autonomous mobile body 100 is recognized on the basis of the information about the movement performance stored in the advance information storage unit 101.

When it is not possible to determine the height that can be passed over by the autonomous mobile body 100, in step ST20, the data accumulation method setting unit 105 changes resolution in the Z-axis direction (vertical direction) to be fine and thus a size of the three-dimensional grid in the Z-axis direction to be small, to a degree that allows determination of the height that can be passed over by the autonomous mobile body 100. By setting the resolution in the Z-axis direction to a degree that allows determination of the height that can be passed over by the autonomous mobile body 100, that is, by the wheel thereof in this manner, it becomes possible to suppress the number of pieces of accumulated data and suppress the calculation cost for environment recognition, without affecting the determination of the height that can be passed over by the wheel.

After the processing of step ST20, the data accumulation method setting unit 105 proceeds to processing of step ST21. Note that when it is possible to determine the height that can be passed over by the autonomous mobile body 100 with the default resolution in step ST19, the data accumulation method setting unit 105 immediately proceeds to the processing of step ST21.

In step ST21, the data accumulation method setting unit 105 determines whether or not continuity of a traveling surface can be determined with the default resolution. When it is not possible to determine the continuity of the traveling surface, in step ST22, resolution in the X-axis direction and the Y-axis direction (horizontal direction) is changed to be fine, and thus a size of the three-dimensional grid in the X-axis direction and the Y-axis direction to be small, to a degree that allows determination of the continuity of the traveling surface. In this way, by setting the resolution in the X-axis direction and the Y-axis direction to a degree that allows determination of the continuity of the traveling surface, it becomes possible to suppress the number of pieces of accumulated data and suppress the calculation cost for environment recognition, without affecting the determination of the continuity of the traveling surface.

After the processing of step ST22, the data accumulation method setting unit 105 ends the processing in step ST18. Note that, when the continuity of the traveling surface can be determined in step ST21, the data accumulation method setting unit 105 immediately ends the processing in step ST18.

Figure 10:
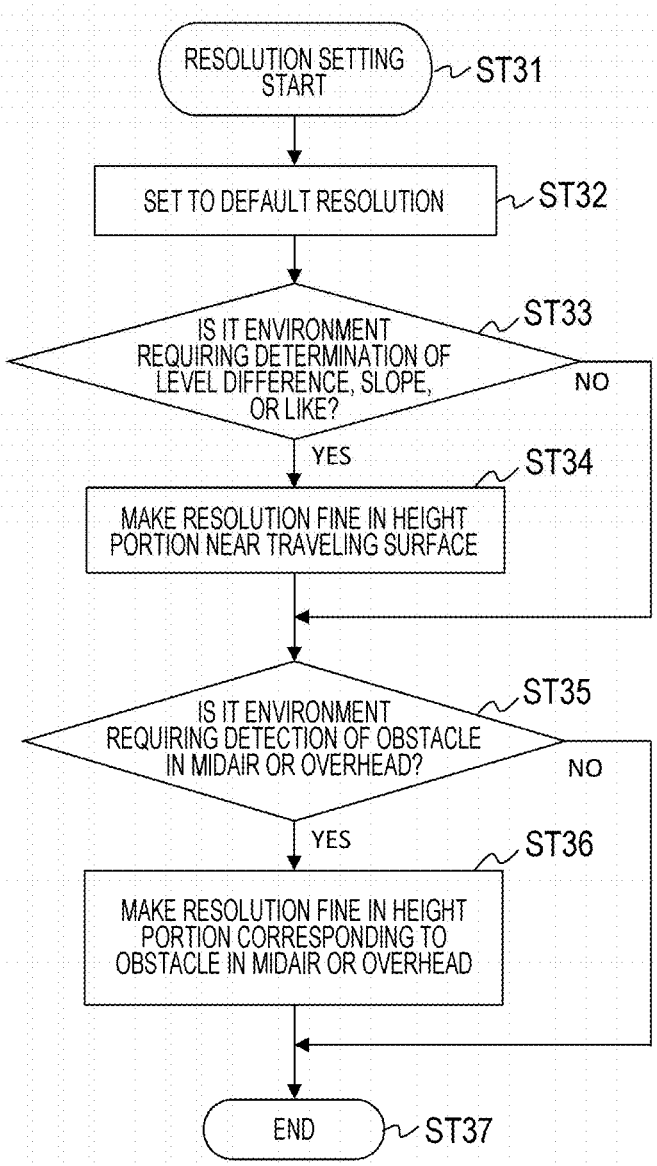
FIG. 10 is a flowchart illustrating another example of a processing procedure of resolution setting of three-dimensional (3D) data accumulation in the data accumulation method setting unit.

A flowchart of FIG. 10 illustrates another example of a processing procedure of resolution setting for three-dimensional (3D) data accumulation (see step ST2 of FIG. 8) in the data accumulation method setting unit 105.

This example is an example in which resolution of the three-dimensional data accumulation is set according to a height. By setting the resolution in accordance with the height in this manner, it is possible to set resolution to be fine only in a height portion requiring fine resolution and set resolution to be coarse in other height portions. Therefore, it becomes possible to suppress the number of pieces of accumulated data and suppress the calculation cost for environment recognition, without affecting accuracy of environment recognition.

First, in step ST31, the data accumulation method setting unit 105 starts processing. Then, in step ST32, the data accumulation method setting unit 105 sets resolution of the three-dimensional data accumulation to default resolution.

Next, in step ST33, the data accumulation method setting unit 105 determines whether or not to be in an environment requiring determination of a level difference, a slope, or the like. This determination is made, for example, on the basis of recognition information about a peripheral environment of the autonomous mobile body 100 from the environment/task target object recognition unit 104. Note that, in a case where information about a level difference, a slope, or the like is embedded in the advance map in association with a position, the determination can also be made on the basis of this information.

In the environment requiring determination a level difference, a slope, or the like, the data accumulation method setting unit 105 makes resolution fine in a height portion near the traveling surface in step ST34. As a result, the level difference, the slope, and the like can be recognized with high accuracy. In this case, it becomes possible to suppress the number of pieces of accumulated data and suppress the calculation cost for environment recognition, without affecting accuracy of environment recognition of the height portion near the traveling surface of the autonomous mobile body 100.

After the processing of step ST34, the data accumulation method setting unit 105 proceeds to processing of step ST35. Note that, in a case of not the environment requiring determination of a level difference, a slope, or the like in step ST33, the data accumulation method setting unit 105 immediately proceeds to the processing of step ST35.

In step ST35, the data accumulation method setting unit 105 determines whether or not to be in an environment requiring detection of an obstacle in midair or overhead, for example, a tunnel, branches of trees, and the like. For example, this determination is made on the basis of recognition information about a peripheral environment of the autonomous mobile body 100 from the environment/task target object recognition unit 104. Note that, in a case where information about an obstacle in midair or overhead is embedded in the advance map in association with a position, the determination can also be made on the basis of this information.

In the environment requiring detection of an obstacle in midair or overhead, in step ST36, the data accumulation method setting unit 105 makes resolution fine in a predetermined height portion corresponding to the obstacle in midair or overhead. As a result, the obstacle in midair and overhead can be recognized with high accuracy. In this case, it becomes possible to suppress the number of pieces of accumulated data and suppress the calculation cost for environment recognition, without affecting accuracy of environment recognition of the height portion corresponding to the obstacle in midair or overhead of the autonomous mobile body 100.

After the processing of step ST36, the data accumulation method setting unit 105 ends the processing in step ST37. Furthermore, in a case of not the environment requiring detection of an obstacle in midair or overhead in step ST35, the data accumulation method setting unit 105 immediately ends the processing in step ST37.

Figure 11:
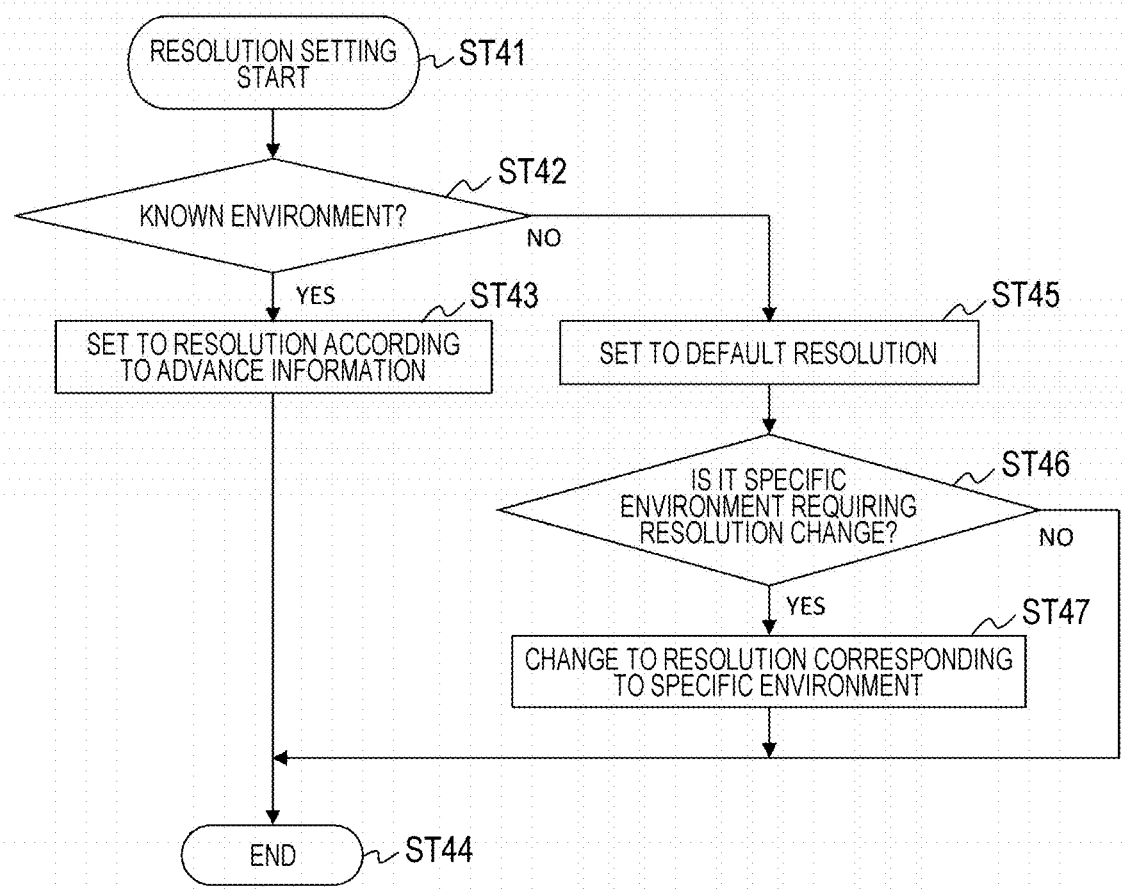
FIG. 11 is a flowchart illustrating another example of a processing procedure of resolution setting of three-dimensional (3D) data accumulation in the data accumulation method setting unit.

A flowchart of FIG. 11 illustrates another example of a processing procedure of resolution setting for three-dimensional (3D) data accumulation (see step ST2 of FIG. 8) in the data accumulation method setting unit 105.

First, in step ST41, the data accumulation method setting unit 105 starts processing. Then, in step ST42, the data accumulation method setting unit 105 determines whether or not to be in a known environment. In this case, for example, when information about resolution as the advance information is embedded in association with a position in the advance map, the data accumulation method setting unit 105 determines to be in a known environment where the autonomous mobile body 100 has moved to in the past.

In the case of the known environment, in step ST43, the data accumulation method setting unit 105 sets resolution of the three-dimensional data accumulation to resolution according to the advance information embedded in the advance map. As a result, it becomes possible to suppress the number of pieces of accumulated data and suppress the calculation cost for environment recognition, without affecting accuracy of environment recognition. After the processing of step ST43, the data accumulation method setting unit 105 ends the processing in step ST44.

Furthermore, in step ST42, in a case of not the known environment, that is, in a case of an unknown environment, the data accumulation method setting unit 105 sets resolution of the three-dimensional data accumulation to the default resolution in step ST45. As a result, it becomes possible to perform environment recognition with a certain degree of accuracy.

Next, in step ST46, the data accumulation method setting unit 105 determines whether or not to be a specific environment requiring a resolution change. This determination is made, for example, on the basis of recognition information about a peripheral environment of the autonomous mobile body 100 from the environment/task target object recognition unit 104. For example, in a case where the peripheral environment is outdoors, it is dangerous if resolution is not set to be fine, and thus it is determined as the specific environment requiring a resolution change. Furthermore, for example, in a case of an environment in which many objects are present around the autonomous mobile body 100, it is dangerous if resolution is not set to be fine, and thus it is determined as the specific environment requiring a resolution change.

In a case of the specific environment requiring a resolution change, in step ST47, the data accumulation method setting unit 105 changes resolution to resolution corresponding to the specific environment. As a result, it becomes possible to suppress the number of pieces of accumulated data and suppress the calculation cost for environment recognition, without affecting accuracy of environment recognition of the specific environment. After the processing of step ST47, the data accumulation method setting unit 105 ends the processing in step ST44. Furthermore, in a case of not the specific environment requiring a resolution change in step ST46, the data accumulation method setting unit 105 immediately ends the processing in step ST44.

Figure 12:
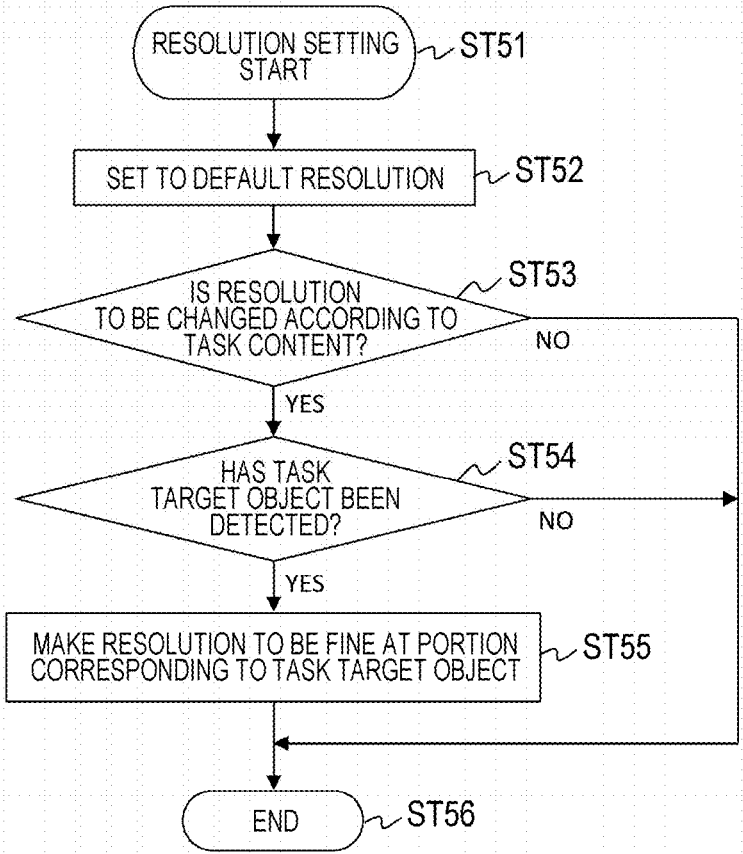
FIG. 12 is a flowchart illustrating another example of a processing procedure of resolution setting of three-dimensional (3D) data accumulation in the data accumulation method setting unit.

A flowchart of FIG. 12 illustrates another example of a processing procedure of resolution setting for three-dimensional (3D) data accumulation (see step ST2 of FIG. 8) in the data accumulation method setting unit 105.

First, in step ST51, the data accumulation method setting unit 105 starts processing. Then, in step ST52, the data accumulation method setting unit 105 sets resolution of the three-dimensional data accumulation to default resolution.

Next, in step ST53, the data accumulation method setting unit 105 determines whether or not to change the resolution according to a task content. Whether or not to change the resolution according to the task content is set in advance by a user, for example, and setting information thereof has been stored in the advance information storage unit 101. The data accumulation method setting unit 105 determines whether or not to change the resolution according to the task content, on the basis of user setting information stored in the advance information storage unit 101.

In changing the resolution in accordance with the task content, the data accumulation method setting unit 105 determines whether or not a task target object has been detected by the environment/task target object recognition unit 104 in step ST54. When the task target object is detected, in step ST55, the data accumulation method setting unit 105 makes resolution to be fine at a portion corresponding to the task target object detected by the environment/task target object recognition unit 104. As a result, it becomes possible to suppress the number of pieces of accumulated data and suppress the calculation cost for environment recognition, without affecting accuracy of recognition of the object (task target object) specified according to the task content.

After the processing of step ST55, the data accumulation method setting unit 105 ends the processing in step ST56. Furthermore, when the resolution is not to be changed according to the task content in step ST53 and when no task target object is detected in step ST54, the data accumulation method setting unit 105 immediately ends the processing in step ST56.

"Processing by software" The processes illustrated in the flowcharts of FIGS. 8 to 12 described above can be executed by hardware, or can also be executed by software. In a case where the series of processing is executed by software, a program constituting the software is installed from a recording medium into, for example, a computer built into dedicated hardware or a general-purpose computer that is capable of executing various functions by installing various programs, or the like.

Figure 13:
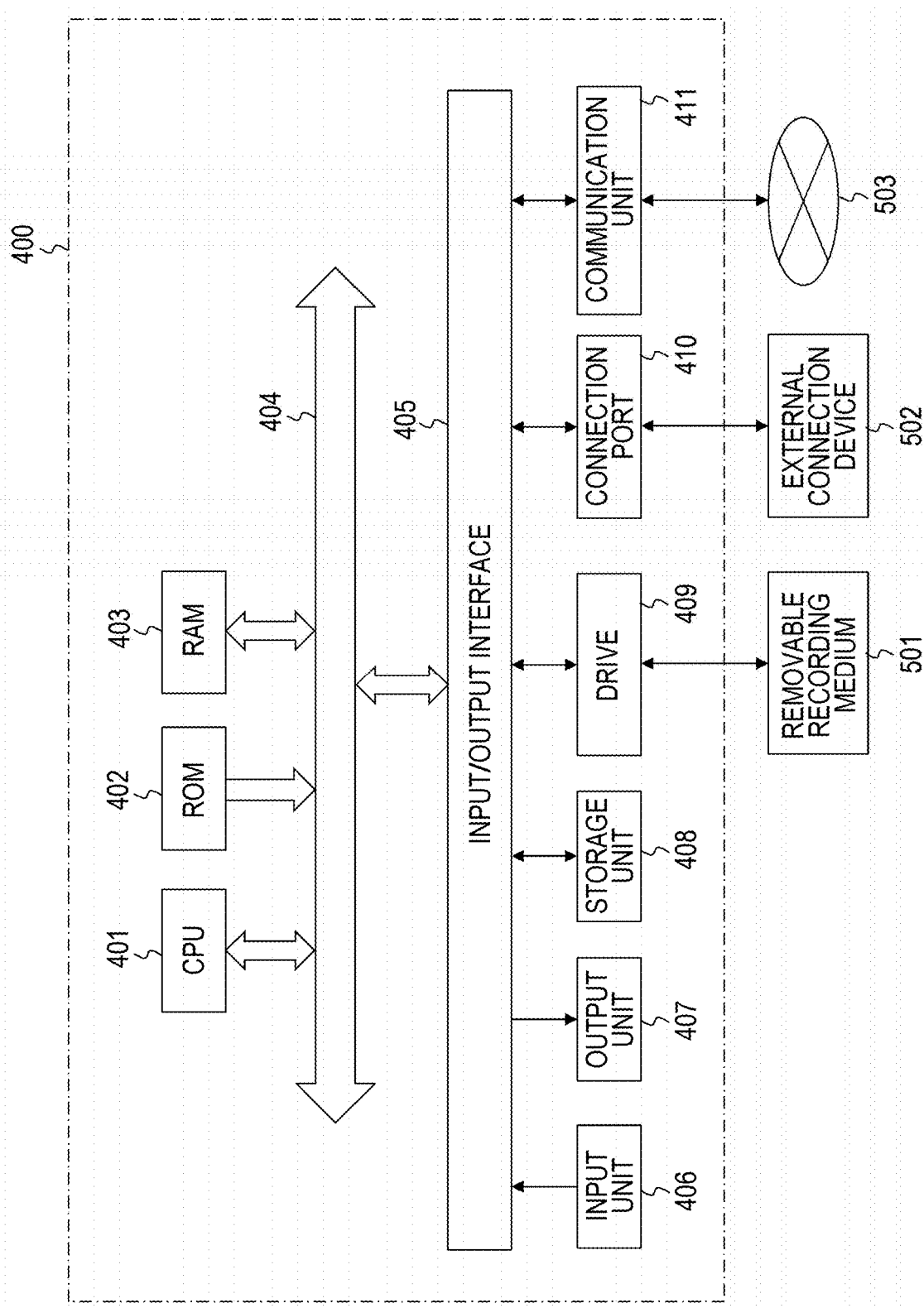
FIG. 13 is a block diagram illustrating a hardware configuration example of a computer.

FIG. 13 is a block diagram illustrating a hardware configuration example of a computer 400. The computer 400 includes a CPU 401, a ROM 402, a RAM 403, a bus 404, an input/output interface 405, an input unit 406, an output unit 407, a storage unit 408, a drive 409, a connection port 410, and a communication unit 411. Note that, the hardware configuration illustrated here is an example, and some of the components may be omitted. Furthermore, components other than the components illustrated here may be further included.

The CPU 401 functions as, for example, an arithmetic processing device or a control device, and controls all or some of the operations of the components on the basis of various programs recorded in the ROM 402, the RAM 403, the storage unit 408, or a removable recording medium 501.

The ROM 402 is a device that stores a program to be read by the CPU 401, data to be used for calculation, and the like. The RAM 403 temporarily or permanently stores, for example, a program to be read by the CPU 401, various parameters that change as appropriate when the program is executed, and the like.

The CPU 401, the ROM 402, and the RAM 403 are connected to each other via the bus 404. In addition, various components are connected to the bus 404 via the interface 405.

As the input unit 406, for example, a mouse, a keyboard, a touch panel, a button, a switch, a lever, and the like are used. Moreover, as the input unit 406, a remote controller (hereinafter referred to as a remote control) capable of transmitting a control signal using infrared rays or other radio waves may be used.

The output unit 407 is a device capable of visually or audibly notifying the user of acquired information, such as a display device such as a cathode ray tube (CRT), an LCD, or an organic EL, an audio output device such as a speaker or a headphone, a printer, a mobile phone, or a facsimile.

The storage unit 408 is a device for storing various kinds of data. As the storage unit 408, for example, a magnetic storage device such as a hard disk drive (HDD), a semiconductor storage device, an optical storage device, a magneto-optical storage device, or the like is used.

The drive 409 is, for example, a device that reads information recorded in the removable recording medium 501 such as a magnetic disk, an optical disc, a magneto-optical disk, or a semiconductor memory, or writes information to the removable recording medium 501.

The removable recording medium 501 is, for example, a DVD medium, a Blu-ray (registered trademark) medium, an HD-DVD medium, various types of semiconductor storage media, or the like. It is needless to say that the removable recording medium 501 may be, for example, an IC card mounted with a non-contact IC chip, an electronic device, or the like.

The connection port 410 is, for example, a port for connecting an external connection device 502 such as a universal serial bus (USB) port, an IEEE1394 port, a small computer system interface (SCSI), an RS-232C port, or an optical audio terminal. The external connection device 502 is, for example, a printer, a portable music player, a digital camera, a digital video camera, an IC recorder, or the like.

The communication unit 411 is a communication device for connection to a network 503, for example, a communication card for wired or wireless LAN, Bluetooth (registered trademark), or wireless USB (WUSB), a router for optical communication, a router for asymmetric digital subscriber line (ADSL), a modem for various communications, or the like.

Note that the program executed by the computer may be a program for processing in time series in the order described in this specification, or a program for processing in parallel or at a necessary timing such as when a call is made.

As described above, in the present technology, an accumulation method for distance measurement data is set on the basis of the drive mechanism, the movement performance, the peripheral environment, or the task content of the autonomous mobile body 100, and it is possible to perform environment recognition with high accuracy while suppressing calculation cost.

2. Modification Example

Note that the preferred embodiments of the present disclosure have been described in detail with reference to the accompanying drawings, but the technical scope of the present disclosure is not limited to such examples. It is apparent that a person having ordinary knowledge in the technical field of the present disclosure can devise various change examples or modification examples within the scope of the technical idea described in the claims, and it will be naturally understood that they also belong to the technical scope of the present disclosure.

Furthermore, the effects described in this specification are merely exemplary or illustrative, and not restrictive. That is, the technique according to the present disclosure can exhibit other effects apparent to those skilled in the art from the description of this specification, in addition to the effects above or instead of the effects above.

Furthermore, the present technology can also have the following configurations.

(1) An information processing apparatus including:
an accumulation method setting unit configured to set an accumulation method for distance measurement data, on the basis of a drive mechanism, movement performance, a peripheral environment, or a task content of an autonomous mobile body.

(2) The information processing apparatus according to (1) above, in which
the accumulation method setting unit determines necessity of three-dimensional data accumulation, and sets to perform two-dimensional data accumulation in a case where the accumulation method setting unit determines that the three-dimensional data accumulation is unnecessary.

(3) The information processing apparatus according to (1) or (2) above, in which
the accumulation method setting unit sets resolution of three-dimensional data accumulation.

(4) The information processing apparatus according to (3) above, in which
the accumulation method setting unit sets resolution of the three-dimensional data accumulation for each of axial directions of three axes of X, Y, and Z.

(5) The information processing apparatus according to (3) above, in which
the accumulation method setting unit sets resolution of the three-dimensional data accumulation in accordance with a height.

(6) The information processing apparatus according to (5) above, in which
the accumulation method setting unit sets resolution of the three-dimensional data accumulation to be finer than other portions, in a height portion near a traveling surface of the autonomous mobile body or a height portion corresponding to an obstacle in midair or overhead.

(7) The information processing apparatus according to (3) above, in which
in a case where a drive mechanism of the autonomous mobile body is a leg, the accumulation method setting unit sets resolution in a Z-axis direction in three axes of X, Y, and Z of the three-dimensional data accumulation to resolution that allows determination of a height that can be passed over by the leg.

(8) The information processing apparatus according to (3) or (7) above, in which
in a case where a drive mechanism of the autonomous mobile body is a leg, the accumulation method setting unit sets resolution in an X-axis direction and a Y-axis direction in three axes of X, Y, and Z of the three-dimensional data accumulation to resolution that allows determination of a location of the leg.

(9) The information processing apparatus according to (3) above, in which
in a case where a drive mechanism of the autonomous mobile body is a wheel, the accumulation method setting unit sets resolution in a Z-axis direction in three axes of X, Y, and Z of the three-dimensional data accumulation to resolution that allows determination of a height that can be passed over by the wheel.

(10) The information processing apparatus according to (3) or (9) above, in which
in a case where a drive mechanism of the autonomous mobile body is a wheel, the accumulation method setting unit sets resolution in an X-axis direction and a Y-axis direction in three axes of X, Y, and Z of the three-dimensional data accumulation to resolution that allows determination of continuity of a traveling surface.

(11) The information processing apparatus according to (3) above, in which
in a case of being in a known environment, the accumulation method setting unit sets resolution of the three-dimensional data accumulation to resolution corresponding to the known environment.

(12) The information processing apparatus according to (11) above, in which the accumulation method setting unit sets resolution of the three-dimensional data accumulation to a default resolution in a case of being in an unknown environment.

(13) The information processing apparatus according to (12) above, in which in a case where a specific environment requiring a resolution change of the three-dimensional data accumulation is detected, the accumulation method setting unit changes resolution of the three-dimensional data accumulation to resolution corresponding to the specific environment.

(14) The information processing apparatus according to (3) above, in which in a case where a target object specified by the task content is detected, the accumulation method setting unit sets resolution of the three-dimensional data accumulation to be finer in a portion corresponding to the target object than that in other portion.

(15) The information processing apparatus according to any one of (1) to (14) above, further including:

an obstacle detection unit configured to detect an obstacle on the basis of the distance measurement data accumulated by a data accumulation method set by the accumulation method setting unit.

(16) An information processing method including:

a procedure of setting an accumulation method for distance measurement data, on the basis of a drive mechanism, movement performance, a peripheral environment, or a task content of an autonomous mobile body.

(17) An autonomous mobile body including:

a sensor unit configured to acquire distance measurement data;

an accumulation method setting unit configured to set an accumulation method for the distance measurement data, on the basis of a drive mechanism, movement performance, a peripheral environment, or a task content;

an obstacle detection unit configured to detect an obstacle on the basis of the distance measurement data accumulated by a data accumulation method set by the accumulation method setting unit; and a movement control unit configured to control movement on the basis of an obstacle detection result of the obstacle detection unit.

REFERENCE SIGNS LIST

100 Autonomous mobile body
101 Advance information storage unit
102 Self-position estimation unit
103 Sensor unit
104 Environment/task target object recognition unit
105 Data accumulation method setting unit
106 Data accumulation unit
107 Obstacle detection unit
108 Obstacle map generation unit
109 Travel control unit
400 Computer

The invention claimed is:

1. An information processing apparatus comprising:

accumulation method setting circuitry configured to set an accumulation method for distance measurement data, on a basis of a drive mechanism, movement performance, a peripheral environment, or a task content of an autonomous mobile body, and set resolution of three-dimensional data accumulation, wherein in a case where the drive mechanism of the autonomous mobile body is a leg, the accumulation method setting circuitry sets resolution in a Z-axis direction in three axes of X, Y, and Z of the three-dimensional data accumulation to resolution that allows determination of a height that can be passed over by the leg.

2. The information processing apparatus according to claim 1, wherein the accumulation method setting circuitry determines necessity of three-dimensional data accumulation, and sets to perform two-dimensional data accumulation in a case where the accumulation method setting circuitry determines that the three-dimensional data accumulation is unnecessary.

3. The information processing apparatus according to claim 1, wherein the accumulation method setting circuitry sets resolution of the three-dimensional data accumulation for each of axial directions of three axes of X, Y, and Z.

4. The information processing apparatus according to claim 1, wherein the accumulation method setting circuitry sets resolution of the three-dimensional data accumulation in accordance with a height.

5. The information processing apparatus according to claim 4, wherein the accumulation method setting circuitry sets resolution of the three-dimensional data accumulation to be finer than other portions, in a height portion near a traveling surface of the autonomous mobile body or a height portion corresponding to an obstacle in midair or overhead.

6. The information processing apparatus according to claim 1, wherein in a case where the drive mechanism of the autonomous mobile body is the leg, the accumulation method setting circuitry sets resolution in an X-axis direction and a Y-axis direction in three axes of X, Y, and Z of the three-dimensional data accumulation to resolution that allows determination of a location of the leg.

7. The information processing apparatus according to claim 1, wherein in a case where the drive mechanism of the autonomous mobile body is a wheel, the accumulation method setting circuitry sets resolution in the Z-axis direction in three axes of X, Y, and Z of the three-dimensional data accumulation to resolution that allows determination of a height that can be passed over by the wheel.

8. The information processing apparatus according to claim 1, wherein in a case where the drive mechanism of the autonomous mobile body is a wheel, the accumulation method setting circuitry sets resolution in an X-axis direction and a Y-axis direction in three axes of X, Y, and Z of the three-dimensional data accumulation to resolution that allows determination of continuity of a traveling surface.

9. The information processing apparatus according to claim 1, wherein in a case of being in a known environment, the accumulation method setting circuitry sets resolution of the three-dimensional data accumulation to resolution corresponding to the known environment.

10. The information processing apparatus according to claim 9, wherein the accumulation method setting circuitry sets resolution of the three-dimensional data accumulation to a default resolution in a case of being in an unknown environment.

11. The information processing apparatus according to claim 10, wherein
in a case where a specific environment requiring a resolution change of the three-dimensional data accumulation is detected, the accumulation method setting circuitry changes resolution of the three-dimensional data accumulation to resolution corresponding to the specific environment.

12. The information processing apparatus according to claim 1, wherein
in a case where a target object specified by the task content is detected, the accumulation method setting circuitry sets resolution of the three-dimensional data accumulation to be finer in a portion corresponding to the target object than that in an other portion.

13. The information processing apparatus according to claim 1, further comprising:
obstacle detection circuitry configured to detect an obstacle on a basis of the distance measurement data accumulated by a data accumulation method set by the accumulation method setting circuitry.

14. An information processing method comprising:
storing, in a storage, movement performance of an autonomous mobile body:
setting an accumulation method for distance measurement data, on a basis of a drive mechanism, the movement performance, a peripheral environment, or a task content of the autonomous mobile body; and
setting resolution of three-dimensional data accumulation,
wherein in a case where a drive mechanism of the autonomous mobile body is a leg, setting resolution in a Z-axis direction in three axes of X, Y, and Z of the three-dimensional data accumulation to resolution that allows determination of a height that can be passed over by the leg.

15. An autonomous mobile body comprising:
a sensor configured to acquire distance measurement data;
accumulation method setting circuitry configured to set an accumulation method for the distance measurement data, on a basis of a drive mechanism, movement performance, a peripheral environment, or a task content, and set resolution of three-dimensional data accumulation;
obstacle detection circuitry configured to detect an obstacle on a basis of the distance measurement data accumulated by a data accumulation method set by the accumulation method setting circuitry; and
movement control circuitry configured to control movement on a basis of an obstacle detection result of the obstacle detection circuitry;
in a case where the drive mechanism of the autonomous mobile body is a wheel, the accumulation method setting circuitry sets resolution in a Z-axis direction in three axes of X, Y, and Z of the three-dimensional data accumulation to resolution that allows determination of a height that can be passed over by the wheel.

* * * * *